United States Patent
Phillips et al.

(10) Patent No.: US 8,489,303 B2
(45) Date of Patent: Jul. 16, 2013

(54) POWERTRAIN CONTROL SYSTEM AND METHODS WITH ECM-TO-TCM PARAMETER TRANSFER PROTOCOLS FOR TCM BASED CONTROL

(75) Inventors: Andrew W. Phillips, Rochester, MI (US); David S. Mathews, Howell, MI (US)

(73) Assignee: GM Global Technology Operations LLC

( * ) Notice: Subject to any disclaimer, the term of this patent is extended or adjusted under 35 U.S.C. 154(b) by 436 days.

(21) Appl. No.: 12/783,162

(22) Filed: May 19, 2010

(65) Prior Publication Data
US 2011/0288734 A1 Nov. 24, 2011

(51) Int. Cl.
*B60T 7/12* (2006.01)
*B60K 28/16* (2006.01)
(52) U.S. Cl.
CPC ..................................... *B60K 28/16* (2013.01)
USPC .................. 701/90; 701/51; 701/58; 701/84; 701/86; 701/87; 180/65.265
(58) Field of Classification Search
CPC ....................................................... B60K 28/16

USPC ......... 701/51, 58, 86, 84, 87, 90; 180/65.265
See application file for complete search history.

(56) References Cited

U.S. PATENT DOCUMENTS

| 4,760,760 | A * | 8/1988 | Miyawaki ....................... 477/43 |
| 2004/0152559 | A1* | 8/2004 | Bolander .......................... 477/53 |
| 2006/0149442 | A1* | 7/2006 | Delaney et al. .................. 701/36 |
| 2006/0224291 | A1* | 10/2006 | Geist et al. ....................... 701/51 |
| 2008/0220934 | A1* | 9/2008 | Babcock et al. ................ 701/22 |
| 2009/0036267 | A1* | 2/2009 | Bellinger ......................... 701/55 |
| 2009/0217916 | A1* | 9/2009 | Graham et al. ............... 123/685 |
| 2009/0308674 | A1* | 12/2009 | Bhattarai et al. .......... 180/65.265 |

* cited by examiner

*Primary Examiner* — Ryan Zeender
*Assistant Examiner* — Hunter Wilder

(57) ABSTRACT

A control system includes an engine control module and a transmission control module. The transmission control module communicates with the engine control module via a network. The engine control module generates a mean engine speed signal and a minimum engine speed signal. The engine control module transmits the mean engine speed signal and the minimum engine speed signal to the transmission control module via the network. The transmission control module controls operation of at least one of a torque converter and a transmission based on the mean engine speed signal and the minimum engine speed signal. The torque converter is connected between an engine and the transmission.

18 Claims, 4 Drawing Sheets

POWERTRAIN CONTROL SYSTEM AND METHODS WITH ECM-TO-TCM PARAMETER TRANSFER PROTOCOLS FOR TCM BASED CONTROL

FIELD

The present disclosure relates to engine and transmission control systems that include an engine control module and a transmission control module.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

An automatic powertrain system may include an engine, a torque converter and a transmission. The torque converter includes an engine side, a transmission side, and an electronically controlled capacity clutch (ECCC). The torque converter converts engine output torque into transmission input torque. A transmission control module is typically used to maintain a target slip on the ECCC.

The smaller the target slip, the less slip in the torque converter clutch. Decreasing slip improves transfer of energy between the engine side and the transmission side, which improves fuel economy. However, the smaller the target slip, the greater the chance that the torque converter clutch will lock-up ("crash"). Control over torque transfer to the transmission using the ECCC is lost when the torque converter clutch locks-up, since the engine side is no longer isolated from the transmission side of the torque converter. The amount of torque transfer is directly related to pressure applied to the ECCC. As a result, transmission torque can fluctuate due to changes in engine torque. Changes in engine torque may include fluctuations due to, for example, changes in combustion cycle speeds.

Also, the larger the target slip, the more slip in the torque converter clutch. Increasing slip increases heat production in the torque converter and decreases fuel economy. Excessive slip can damage the torque converter clutch. Thus, a predetermined target slip is maintained using the ECCC to: provide torque transfer control; minimize heat generation in the torque converter; and satisfy fuel economy requirements.

SUMMARY

A control system is provided that includes an engine control module and a transmission control module. The transmission control module communicates with the engine control module via a network. The engine control module generates a mean engine speed signal and a minimum engine speed signal. The engine control module transmits the mean engine speed signal and the minimum engine speed signal to the transmission control module via the network. The transmission control module controls operation of at least one of a torque converter and a transmission based on the mean engine speed signal and the minimum engine speed signal. The torque converter is connected between an engine and the transmission.

In other features, an engine control module is provided and includes a mean engine speed module that generates a mean engine speed signal based on a raw engine speed signal. A minimum engine speed module generates a minimum engine speed signal based on the raw engine speed signal. A transceiver transmits the mean engine speed signal and the minimum engine speed signal to a transmission control module via a network.

In yet other features, a transmission control module is provided and includes a transceiver that receives a mean engine speed signal and a minimum engine speed signal from an engine control module via a network. A torque slip module adjusts a torque slip of a torque converter based on the mean engine speed signal and the minimum engine speed signal.

In still other features, the systems and methods described above are implemented by a computer program executed by one or more processors. The computer program can reside on a tangible computer readable medium such as but not limited to memory, nonvolatile data storage, and/or other suitable tangible storage mediums.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
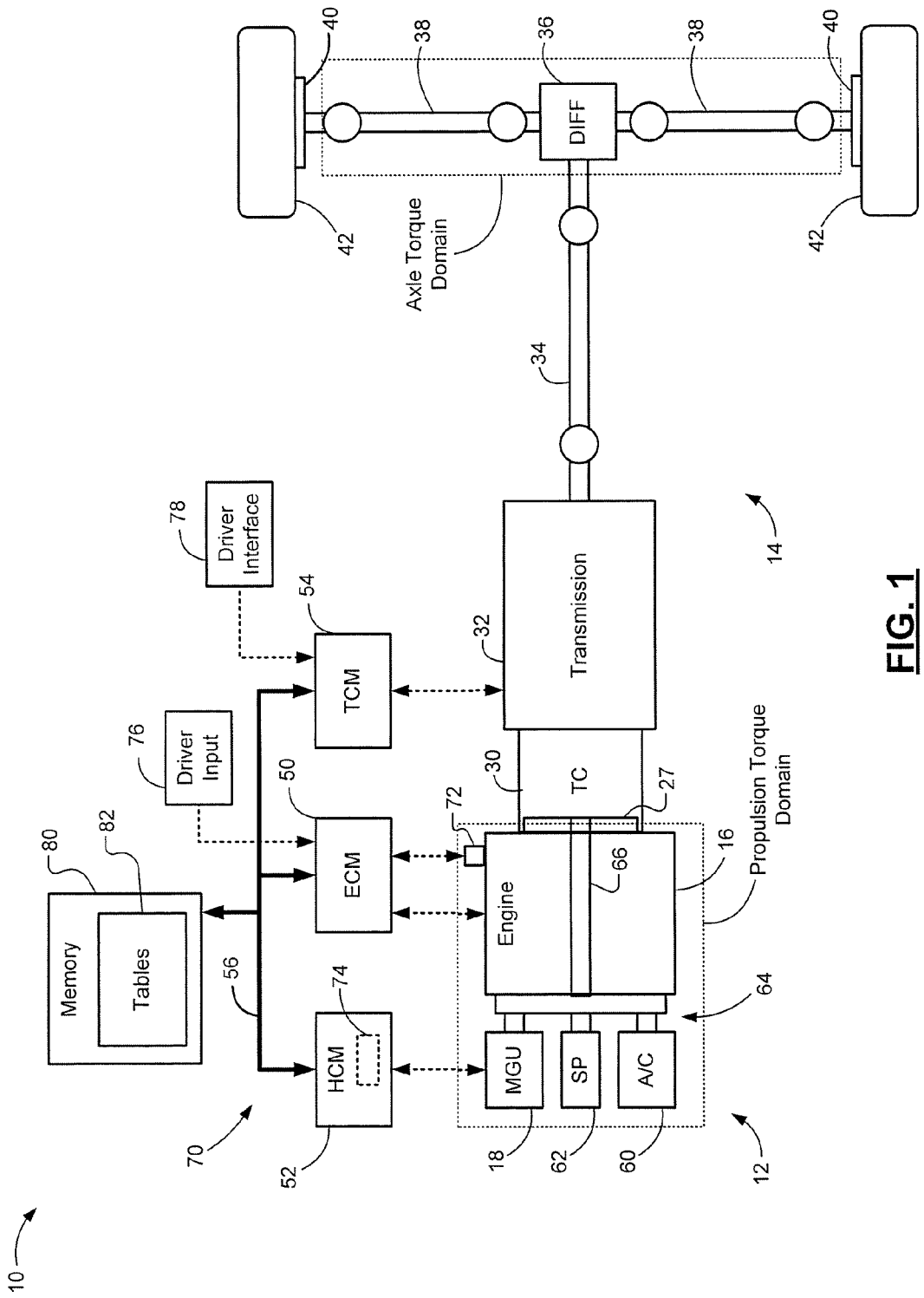
FIG. 1 is a functional block diagram of a hybrid powertrain system incorporating engine and transmission control in accordance with an embodiment of the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Also, as used herein, the term combustion cycle refers to the reoccurring stages of an engine combustion process. For example, in a 4-stroke internal combustion engine, a single combustion cycle may refer to and include an intake stroke, a compression stroke, a power stroke and an exhaust stroke of a cylinder. The four-strokes are repeated during operation of the engine.

In addition, although the following embodiments are described primarily with respect to example internal combustion engines, the embodiments of the present disclosure may apply to other internal combustion engines. For example, the present invention may apply to compression ignition, spark ignition, homogenous spark ignition, homogeneous charge compression ignition, stratified spark ignition, diesel, and spark assisted compression ignition engines.

A target slip may be set by a calibrator and based on an operating point of a powertrain. The target slip may be set, for example, based on noise and/or vibration of the powertrain. This may not account for variations in cylinder output torque or cylinder imbalance that can occur with respect to a single engine, between multiple engines, and/or between multiple vehicles. During a typical combustion cycle of a cylinder, which may be operating at a steady mean speed, an engine crankshaft exhibits fluctuations in speed due to combustion and inertial torques. Speed data of the crankshaft includes harmonics associated with the firing frequency of each cylinder of the engine and sub-harmonic content due to cylinder-to-cylinder variations (i.e. cylinder imbalance).

Cylinder imbalance may be due to differences in fuel quantities, intake air volumes, spark timing, combustion chamber volumes, valve sizes and operation, etc. Cylinder imbalance can cause fluctuations in engine speed. The fluctuations may be based on a firing event of each cylinder of an engine or averaged over multiple firing events (e.g., a full combustion cycle—2 rotations of a crankshaft).

Various torque converter and transmission control algorithms rely on timely estimation of engine speed, acceleration, and torque. As an example, an algorithm of a transmission control module (TCM) may adjust a target slip or slip torque based on engine speed information. The TCM may adjust the slip torque to account for cylinder imbalance. The engine speed information may be provided from an engine control module (ECM) to the TCM to account for the cylinder imbalance.

High-spatial-resolution (i.e. high-speed) measurements of an engine may be taken detect the speed dynamics of a crankshaft. High-resolution (raw or instantaneous) speed data may be collected by the ECM. Transmitting instantaneous engine speed data from the ECM to the TCM over, for example, a car area network (CAN) is generally not feasible due to transfer speed and bandwidth capabilities of the CAN and/or processing capabilities of the ECM and/or TCM. Further to transfer and account for the entire instantaneous engine speed data is not needed, as pressure of a torque converter clutch or slip torque typically can not be adjusted as quickly as engine speed can fluctuate.

In the following described embodiments, certain engine speed information is provided from an ECM to a TCM to allow the TCM to account for cylinder imbalance. The engine speed information allows the TCM to account for maximum increases and/or decreases in engine speed. The information is transferred with minimal use in bandwidth while providing improved torque converter and transmission system performance.

In FIG. 1, an exemplary hybrid powertrain system 10 is shown. Although the powertrain system 10 is illustrated as a hybrid and rear wheel drive (RWD) powertrain, it is appreciated that the embodiments of the present disclosure can be implemented with any other hybrid and non-hybrid powertrain configurations.

The powertrain system 10 includes a propulsion system 12 and a drivetrain system 14. The propulsion system 12 includes an internal combustion engine (ICE) 16 and an electric motor (EM) or a motor generator unit (MGU) 18. The drive train system 14 includes a flexplate or flywheel 27, a torque converter or other coupling device 30, a transmission 32, a driveshaft 34, a differential 36, axle shafts 38, brakes 40 and driven wheels 42. The propulsion system 12 has an ECM 50 and may have a hybrid control module (HCM) 52. The drivetrain system 14 has a TCM 54.

The control modules 50, 52, 54 share information with each other over a network 56, such as a CAN. The ECM 50 may determine, for example, an average or mean engine speed $S_{Emean}$ and a minimum engine speed $S_{Emin}$. The TCM 54 receives the mean and minimum engine speeds $S_{Emean}$, $S_{Emin}$ and may determine slip torque $T_{slip}$, torque converter torque $T_{CT}$, etc. The TCM 54 may also determine propulsion torque or back torque $T_{PROPTCM}$. The back torque $T_{PROPTCM}$ is equal to the torque applied on the crankshaft 66 by the torque converter 30. The back torque $T_{PROPTCM}$ may be equal in magnitude to the output torque of the engine 16. Thus, the engine output torque may be estimated based on the back torque $T_{PROPTCM}$. The slip torque $T_{slip}$, torque converter torque $T_{CT}$, and back torque $T_{PROPTCM}$ may be based on the mean and minimum engine speeds $S_{Emean}$, $S_{Emin}$ determined by the ECM 50.

The ECM 50 may be able to determine certain parameters directly and without estimation that the TCM 54 may otherwise need to estimate, and vice versa. Also, the ECM 50 and the TCM 54 may be able to collect information for certain parameters at a higher rate than can be transmitted over the network 56. In other words, the frequency at which the ECM 50 and the TCM 54 collect data may be higher than the frequency at which the same data can be transferred over the network 56. The bandwidth available for transfer of information between the ECM 50 and the TCM 54 may be limited. For example, the ECM 50 may be able to collect data from multiple engine speed sensors at a first rate, but may transfer a single engine speed signal at a second rate over to the TCM 54. The second rate may be less than the first rate. The sharing of information allows the ECM 50 and TCM 54 to utilize information, otherwise estimated or unavailable in performing engine and transmission control tasks.

The propulsion system 12 may also include auxiliary components, such as an A/C compressor 60 and a steering pump 62. The MGU 18 and the auxiliary components may be coupled to the ICE 16 using a belt and pulley system 64. The belt and pulley system 64 may be coupled to a crankshaft 66 of the ICE 16 and enable torque to be transferred between the crankshaft 66 and the MGU 18 and/or the auxiliary components. This configuration is referred to as a belt alternator starter (BAS) system. The crankshaft 66 drives the drivetrain system 14.

In operation, output torque from the MGU 18 may be applied to the crankshaft 66. Propulsion torque of the crankshaft 66 is transferred through the drivetrain system components to provide an axle torque $T_{AXLE}$ at the axle shafts 38 to drive the wheels 42. The axle torque $T_{AXLE}$ may be referred to as the powertrain output torque. More specifically, the propulsion torque is multiplied by several gear ratios provided by the coupling device 30, the transmission 32 and the differential 36 to provide the axle torque $T_{AXLE}$. Essentially, the propulsion torque is multiplied by an effective gear ratio, which is a function of a ratio introduced by the coupling device 30, a transmission gear ratio determined by transmission input/output shaft speeds, a differential ratio, as well as any other component that may introduce a ratio in the drivetrain system 14 (e.g., a transfer case in a four wheel drive (4WD) or all wheel drive (AWD) powertrain). For the purposes of torque control, the axle torque domain includes the ICE 16 and the MGU 18.

The powertrain 10 also includes a control system 70, which may regulate torque output of the engine 16 and the MGU 18. The control system 70 includes the control modules 50, 52, 54. The control system 70 may regulate the torque output of the MGU 18 based on speed of the MGU 18, which may be detected by, for example, one or more engine speed sensors 72. The engine speed sensors 72 may detect position and/or speed of an object, such as position and/or speed of the crankshaft 66 (and/or a camshaft). The information from the engine speed sensors 72 may be provided directly to the control modules 50, 52, 54. In one embodiment, the engine speed signals are provided to the ECM 50. The engine speed signals may be considered raw engine speed signals until signal conditioned by the ECM 50 or other signal conditioning circuitry.

The raw engine speed signals and/or the signal conditioned engine speed signals may be generated based on notches, teeth, threads, mark, etc. on, for example, a rotating object. The rotating object may be, for example, the crankshaft 66, a camshaft, a flywheel, or a wheel, pulley or gear connected to the crankshaft 66 or a camshaft. In one embodiment, approximately 50-60 engine speed sensors 72 are used and positioned about a circumference of a rotating object. This allows for precise position and speed information on the rotating object. As an example, the ECM 50 may monitor rotation time between teeth of the rotating object, as detected by the engine speed sensors 72. As another example, the ECM 50 may monitor rotation time of a tooth of the rotating object between engine speed sensors 72. The ECM 50 may analyze the engine speed signals and provide resulting information to the TCM 54. For example only, the resulting information may include the mean and minimum engine speeds $S_{Emean}$, $S_{Emin}$.

The mean engine speed $S_{Emean}$ may be generated based on one or more firing events and/or one or more combustion cycles. A firing event refers to a spark event of a cylinder of an engine. As an example, a four cylinder four stroke engine may experience two firing events per revolution of a crankshaft of the engine. Although the ECM 50 may receive engine speed information from the engine speed signals for each firing event and/or combustion cycle, the ECM 50 may not transmit all of this information to the TCM 54.

The ECM 50 determines the mean and minimum engine speeds $S_{Emean}$, $S_{Emin}$ based on respective predetermined periods. The predetermined periods may include multiple firing events and/or multiple combustion cycles. The predetermined periods may be set to prevent a weak cylinder from reducing engine speed to such an extent that a torque converter lock-up occurs for more than a lock-up threshold period. By providing the TCM 54 with mean and minimum engine speeds $S_{Emean}$, $S_{Emin}$, the ECM 50 is informing the TCM 54 of the weak and/or weakest cylinders. The TCM 54 is also informed of the strong and/or strongest cylinders. The TCM 54 may then adjust torque slip accordingly.

The ECM 50 may monitor increases and decreases in the raw engine speed (unconditioned or conditioned) $S_{Eraw}$ and/or the mean engine speed $S_{Emean}$. For adequate isolation between the engine and transmission sides of the torque converter 30 the ECM 50 may monitor the mean engine speed $S_{Emean}$, as opposed to the raw (or instantaneous) engine speed $S_{Eraw}$. Minimum points in the raw engine speeds $S_{Eraw}$ and/or the mean engine speed $S_{Emean}$ may be detected and/or averaged over a predetermined period. The ECM 50 may also, or as an alternative, determine a difference between an engine speed (e.g., raw engine speed $S_{Eraw}$ and/or the mean engine speed $S_{Emean}$) and a minimum engine speed (e.g., the detected and/or average minimum engine speeds) to generate an offset value. The ECM 50 may transmit the minimum engine speeds, the average minimum engine speeds, and/or offset values to the TCM 54. The engine speed and offset values may be transmitted directly to the TCM 54 or to the memory 80 for access by the TCM 54.

The ECM 50, the HCM 52 and/or the TCM 54 control powertrain output torque. The HCM 52 can include one or more sub-modules including, but not limited to, a BAS control processor (BCP) 74. A driver input 76 communicates with the ECM 50. The driver input 76 can include, but is not limited to, an accelerator pedal and/or a cruise control system input. A driver interface 78 communicates with the TCM 54. The driver interface 78 includes, but is not limited to, a transmission range selector (e.g., a PRNDL lever). The control modules 50, 52, 54 may communicate with memory 80, which includes tables 82. Information that is generated by each of the modules 50, 52, 54 may be directly transmitted between the modules 50, 52, 54 or stored in the memory 80 for access by each of the modules.

Figure 2:
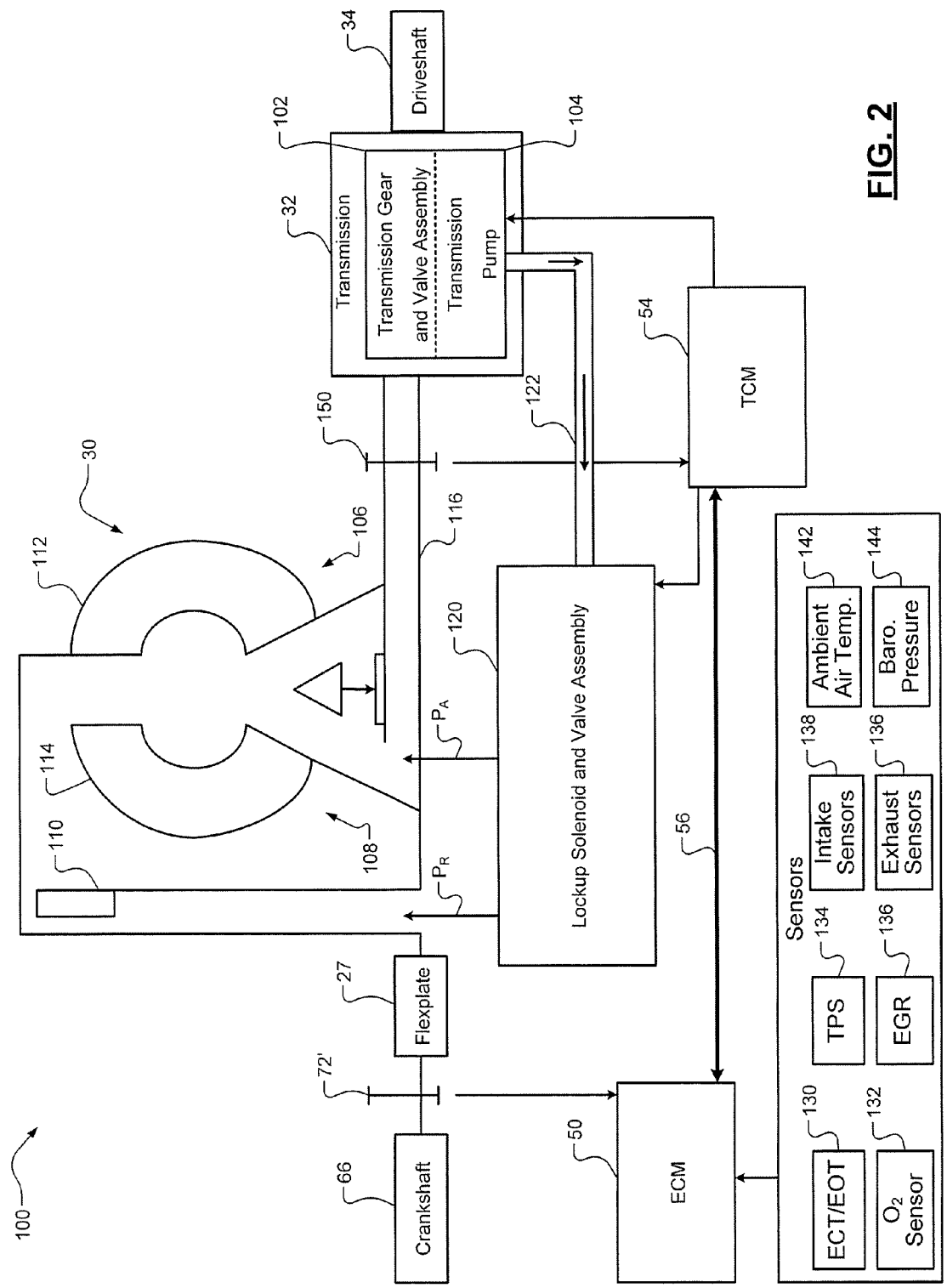
FIG. 2 is a functional block and schematic diagram of a portion of the hybrid powertrain system of FIG. 1.

Referring now also to FIG. 2, a functional block and schematic diagram of a portion 100 of the hybrid powertrain system 10 is shown. Portions of the propulsion, drivetrain and control systems 12, 14, 70 are shown including the torque converter 30, the transmission 32, the ECM 50, the TCM 54 and the crankshaft 66. The transmission 32 includes a transmission gear and valve assembly 102 and a transmission pump 104.

The torque converter 30 includes an engine side 106, a transmission side 108, and an electronically controlled capacity clutch (ECCC) 110. The engine side 106 includes an impellar housing 112 (i.e. torque converter pump) that is connected to the flexplate 27, which in turn is connected to the crankshaft 66. The impellar housing 112 may be connected to the transmission pump 104. The transmission side 108 includes a turbine 114 that is connected to a transmission input shaft 116. The transmission input shaft 116 is connected to the transmission gear and valve assembly 102, which transfers torque to the driveshaft 34.

The propulsion torque from the crankshaft 66 is provided to the flex plate 27 and in turn to the impellar housing 112. As the impellar housing 112 is rotated, torque is transferred to the turbine 114, which creates pump torque $T_P$ in the transmission pump 104. The transmission pump 104 pumps transmission fluid to the transmission gear and valve assembly 102 and to a lockup solenoid and valve assembly 120 via a transmission fluid path or line 122. Although, the transmission fluid line 122 is shown as being connected between the transmission pump 104 and the lockup solenoid and valve assembly 120, the transmission fluid line 122 also supplies fluid to the transmission gear and valve assembly 102.

The TCM 54 controls pressure in the transmission fluid line 122 by controlling apply and release fluid pressures $P_A$ and $P_R$ in the torque converter 30, which in turn controls torque converter slip torque $T_{slip}$ between the impellar housing 112 and the turbine 114. The TCM 54 adjusts and maintains the torque converter slip torque $T_{slip}$, by controlling pressure on the ECCC 110. The TCM 54 controls pressure on the ECCC 110 by adjusting the fluid pressures $P_A$ and $P_R$ via the lockup solenoid and valve assembly 120.

The TCM 54 communicates with the ECM 50 via the network 56. The ECM 50 receives engine speed signals from one or more engine speed sensors, such as from an engine speed sensor 72'. The ECM 50 receives signals from other sensors, such as from an engine coolant temperature (ECT) and engine oil temperature (EOT) sensors 130, an oxygen sensor 132, a throttle position sensor 134, an exhaust gas recirculation (EGR) sensor 136, intake sensors 138, exhaust sensors 140, an ambient air temperature sensor 142, and a barometric pressure sensor 144. The intake sensors 138 may include a mass air flow (MAF) sensor, an intake air temperature (IAT) sensor, and an intake manifold absolute pressure (MAP) sensor. The exhaust sensors 136 may include exhaust flow, temperature and pressure sensors.

The TCM 54 receives a turbine speed signal from a turbine speed sensor 150. The TCM 54 may also receive sensor signals from sensors and valves of the transmission and the lockup solenoid and valve assembly 120. For example, the TCM 54 may receive valve position signals, torque converter pressure signals, transmission fluid pressure signals, etc.

The ECM 50 and the TCM 54 share various information over the network 56. The ECM 50 may share, for example, engine speed information, such as the mean and minimum engine speeds $S_{Emean}$, $S_{Emin}$ with the TCM 54. The ECM 50 may also share engine output torque and acceleration information with the TCM 54. The TCM 54 controls operation of the torque converter 30 and/or the transmission 32 based on the information received from the ECM 50. The TCM 54 may share, for example, propulsion torque (e.g., engine output torque), engine speed and engine acceleration information with the ECM 50.

The ECM 50 may determine engine position, speed and/or minimum engine speed based on: engine position and/or speed signals from the engine speed sensors 72'; back torque information from the TCM 54; engine speed information from the TCM 54; etc. The ECM 50 may determine derivatives of engine position and engine speed to obtain acceleration (and/or deceleration) of the engine 16. The position, speed (velocity) and acceleration information may be determined based on: the engine speed signals from the engine speed sensors; a propulsion torque signal, an engine speed signal and/or an acceleration signal from the TCM 54; etc.

The ECM 50 may further monitor deviation in, for example, an expected output torque of the engine 16 or deviation from a minimum spark for best torque (MBT). The monitoring may be based on the engine speed, engine acceleration, and propulsion torque signals from the TCM 54. Determining, monitoring and receiving of engine speeds, engine accelerations, and propulsion torques may be used to control operations, such as throttle position, spark and fuel timing, and fuel quantities of the engine 16.

The TCM 54 may determine derivatives of engine position and engine speed to obtain acceleration (and/or deceleration) of the engine 16. The position, speed (velocity) and acceleration information may be determined based on: an engine speed signal from the ECM 50; engine speed signals from engine speed sensors (e.g., the engine speed sensor 72'); the turbine speed signal; pressures within the torque converter 30; etc.

Figure 3:
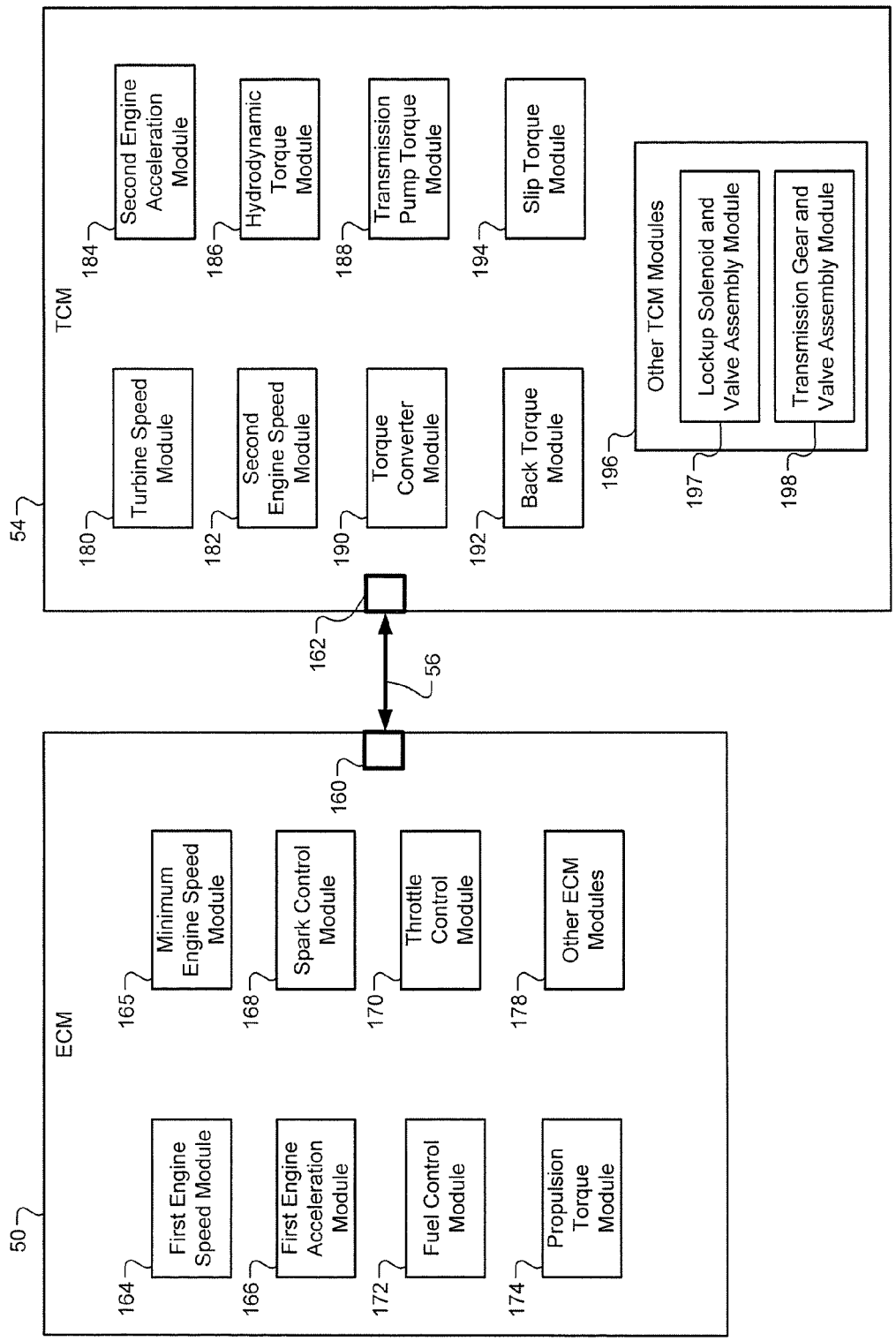
FIG. 3 is a functional block diagram of an engine control module and a transmission control module in accordance with an embodiment of the present disclosure.

Referring now also to FIG. 3, a functional block diagram of the ECM 50 and the TCM 54 is shown. The ECM 50 is distinct from and communicates with the TCM 54 over the network 56. The ECM 50 includes a first transceiver 160. The TCM 54 includes a second transceiver 162. In one embodiment, the first and second transceivers 160, 162 are connected to the network 56 via wired connections. In another embodiment, the first transceiver 160 wirelessly communicates with the second transceiver 162.

The ECM 50 includes a first engine speed module 164, a minimum engine speed module 165, an engine acceleration module 166, a spark control module 168, a throttle control module 170, a fuel control module 172, a propulsion torque module 174, and may include other modules 178, such as a cruise control module, a cylinder deactivation module, a diagnostic module, etc. The modules 168, 170, 172, 174 may be referred to as parameter control modules. The first engine speed module 164 determines the mean engine speed of the engine 16 based on engine speed signals and/or other parameters described herein. The minimum engine speed module 165 determines minimum engine speeds and/or average minimum engine speeds over predetermined periods, as described herein.

Figure 4:
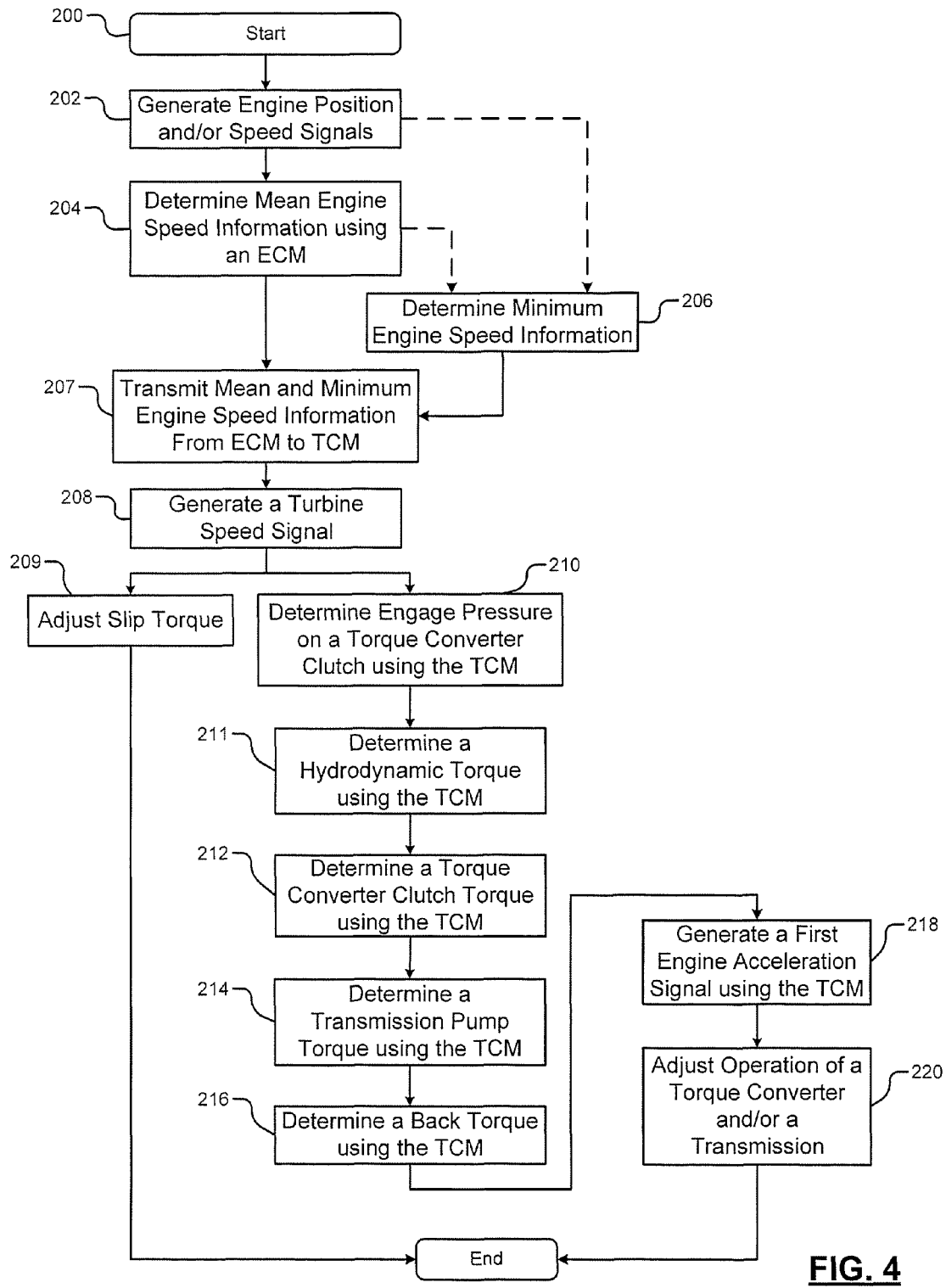
FIG. 4 is a flow diagram illustrating a method of operating a powertrain control system in accordance with an embodiment of the present disclosure.

The control modules 168, 170, 172, 174 control respectively spark timing, throttle position, fuel timing and fuel quantities, and propulsion torque or output torque of the engine 16 based on parameters described with respect to the embodiments of FIGS. 1, 2 and 4. Example parameters are engine speed, coolant and oil temperatures, barometric pressures, etc.

The TCM 54 includes a turbine speed module 180, a second engine speed module 182, an engine acceleration module 184, a hydrodynamic torque module 186, a transmission pump torque module 188, a torque converter module 190, a back torque module 192, a slip torque module 194, and may include other modules 196. The other modules 196 may include a lockup solenoid and valve assembly module 197 and a transmission gear and valve assembly module 198. The turbine speed module 180 determines the speed of the turbine 114 based on the turbine speed signals $S_T$ and/or other parameters described herein. The module 186, 188, 190, 192 determine respectively hydrodynamic torques $T_{HYDINPUT}$, $T_{HYDOUTPUT}$ of the torque converter 30, transmission pump toque $T_P$ of the transmission 32, torque converter clutch torque $T_{CT}$, and back torque $T_{PROPTCM}$ on the engine 16, as described with respect to the embodiments of FIGS. 1, 2 and 4.

The slip torque module 194 determines apply, release and/or engage pressures $P_A$, $P_R$, $P_{TCC}$ of the torque converter clutch. The slip torque module 194 may determine, set and/or adjust a predetermined slip torque $T_{slip}$ by adjusting the pressures $P_A$, $P_R$, $P_{TCC}$ based on, for example, the mean and minimum engine speed information described herein.

The lockup solenoid and valve assembly module 197 controls the lockup solenoid and valve assembly 120, for example, to maintain the predetermined clutch slip torque $T_{slip}$ and/or to adjust the pressure in the transmission fluid line 122. The transmission gear and valve assembly module 198 may control the transmission gear and valve assembly 102 to adjust pressure in the transmission fluid line 122.

Referring now also to FIG. 4, a flow diagram illustrating a method of operating a powertrain control system is shown. Although the following tasks performed at 202-236 are described primarily with respect to the embodiments of FIGS. 1-3, the tasks performed at 202-220 may be applied to other embodiments of the present disclosure.

The method may begin at 200. At 202, engine speed sensors, such as the sensors 72, 72', generate engine position and/or speed signals. At 204, the ECM 50 and/or the first engine speed module 164 generates a mean engine speed signal $S_{Emean}$ based on the engine position and/or speed signals. The mean engine speed signal $S_{Emean}$ may be an average engine speed over a predetermined period and generated based on spark timing, fuel quantities, misfire detection, etc. and transmitted to the TCM 54. A misfire may refer to when fuel in a cylinder does not ignite during a spark firing event. The predetermined period may be equal to period of a combustion cycle of a cylinder or a full combustion cycle of the engine 16.

At 206, the ECM 50 determines minimum engine speed information including minimum and/or average minimum engine speeds (absolute values) during a predetermined period. The minimum engine speed information may be determined based on raw engine speed signals, conditioned raw engine speed signals, and/or the mean engine speed signal $S_{Emean}$ (denoted by dashed lines between 202 and 206 and between 204 and 206).

At 207, the ECM 50 transmits the mean and minimum engine speed information to the TCM 54. The mean and minimum engine speed information may be nominally "smooth" (constant or with minimal fluctuations) and/or free of cylinder-to-cylinder and/or other engine speed dynamics. At 208, the turbine speed sensor 150 generates a turbine speed signal $S_T$. In one embodiment the TCM 54 proceeds from 207 to 209. In an alternative embodiment, the TCM proceeds from 207 to 210.

At 209, the TCM 54 and/or the slip torque module 194 adjusts the slip torque $T_{slip}$ (targeted torque slip) based on the mean and minimum engine speed information received as respective mean and minimum engine speed signals. A desired slip torque may be determined using equation 1. Although, torque slip of equation 1 is a function of mean engine speed and minimum engine speed, torque slip may also be a function of throttle position, spark timing, and fuel quantities. This additional information may be provided from the ECM 50 to the TCM 54 or stored in the memory 80.

$$T_{slip} = F\{S_{Emean}, S_{Emin}\} \tag{1}$$

The minimum engine speed information may include the minimum engine speed $S_{Emin}$, an average minimum engine speed, or an offset value. The torque slip $T_{slip}$ may be a function of one or more of the minimum engine speed, the average minimum engine speed, and the offset value. Apply, release, and/or engage pressures $P_A$, $P_R$, $P_{TCC}$ may be determined based on, for example, equations 2-3. The fluid pressures $P_A$ and $P_R$ may be a function of, for example, a commanded torque slip, a predetermined torque slip, the mean engine speed, and/or the minimum engine speed or the offset value.

$$P_A = F\{T_{slip}, S_{Emean}, S_{Emin}\} \quad (2)$$

$$P_R = F\{T_{slip}, S_{Emean}, S_{Emin}\} \quad (3)$$

The engage pressure $P_{TCC}$ may be a commanded apply pressure and/or based on the fluid pressures $P_A$ and $P_R$ and/or the fluid pressure $P_{line}$ in the transmission fluid line 122. As an example, the engage pressure $P_{TCC}$ may be equal to a difference between the fluid pressures $P_A$ and $P_R$. The line pressure $P_{line}$ may be a commanded line pressure, an estimated line pressure, and/or directly measured via a line pressure sensor. The line pressure $P_{line}$ may be determined based on the mean engine speed $S_{Emean}$, a turbine speed $S_T$, the pressures $P_A$ and $P_R$, etc.

For example, the torque slip $T_{slip}$ may be increased when the mean and/or minimum (or average minimum) engine speeds $S_{Emean}$, $S_{Emin}$ decrease to maintain at least a predetermined minimum torque slip. Similarly, the torque slip $T_{slip}$ may be decreased when the mean and/or minimum (or average minimum) engine speeds $S_{Emean}$, $S_{Emin}$ increase to maintain at least the predetermined minimum torque slip. As another example, the torque slip $T_{slip}$ may be increased when an offset value between an engine speed (raw or mean engine speed) and the minimum (or average minimum) engine speed $S_{Emin}$ increases to maintain at least the predetermined minimum torque slip and vice versa.

The predetermined minimum torque slip may be set to minimize engine speed at idle for improved fuel economy while maintaining isolation between the engine side and transmission side of the torque converter 30. The predetermined minimum torque slip may be set, for example, by the TCM 54 to minimize the number of torque converter lock-ups and/or the period in which the torque converter 30 is in a lock-up state. The TCM 54 may monitor the number of lock-ups within a predetermined period and/or the length of time that the TCM 54 remains in the lock-up state.

The torque slip $T_{slip}$, the apply, release and engage pressures $P_A$, $P_R$, $P_{TCC}$, and/or the line pressure $P_{line}$ may be adjusted based on the number of lock-ups within a predetermined period and/or the length of time that the TCM 54 remains in the lock-up state. The number of lock-ups and/or the length of time that the TCM 54 remains in the lock-up state may be compared with respective thresholds. The torque slip $T_{slip}$, the apply, release and engage pressures $P_A$, $P_R$, $P_{TCC}$, and/or the line pressure $P_{line}$ may be adjusted when one or more of the thresholds are exceeded.

At 210, the TCM 54 and/or the slip torque module 194 determines the engage pressure $P_{TCC}$ on the ECCC 110. At 211, the TCM 54 and/or the hydrodynamic torque module 186 determines input hydrodynamic torque $T_{HYDINPUT}$, and may determine output hydrodynamic torque $T_{HYDOUTPUT}$.

The input and output hydrodynamic torques $T_{HYDINPUT}$, $T_{HYDOUTPUT}$ may be determined, for example, using equations 4-9. The torque ratio (TR) is a function of the speed ratio (SR), as shown by equation 5. The $C_{factor}$ and the $K_{factor}$ are based on the speed ratio, as shown by equation 6. The $C_{factor}$ when plotted versus the speed ratio SR is generally constant for values of the speed ratio SR near 0. The $C_{factor}$ decreases at an increasing rate as the speed ratio increases from 0 to 1.

$$SR = \frac{S_T}{S_{Emean}} \quad (4)$$

$$TR = F\{SR\} \quad (5)$$

$$C_{factor} = \frac{1}{K_{factor}^2} = F\{SR\} \quad (6)$$

$$T_{PROP} = C_{factor} \times S_{Emean}^2 \quad (7)$$

$$T_{HYDINPUT} = \left(\frac{S_{Emean}}{K_{factor}}\right)^2 \quad (8)$$

$$T_{HYDOUTPUT} = TR \times C_{factor} \times S_{Emean}^2 \quad (9)$$

At 212, the TCM 54 and/or the torque converter module 190 determines a torque converter clutch torque MT. The torque converter clutch torque $T_{CT}$ may be determined using equation 10. $G_{TCC}$ is a torque converter clutch gain.

$$T_{CT} = F\{P_{TCC}, G_{TCC}\} \quad (10)$$

At 214, the TCM 54 and/or the transmission pump torque module 188 determines the transmission pump torque $T_P$. The transmission pump torque $T_P$ may be determined using equation 11.

$$T_P = F\{S_{Emean}, P_{line}\} \quad (11)$$

After 214, the TCM may proceed to 216 and/or 226.

At 216, the TCM 54 and/or back torque module 192 determines input torque to, for example, the torque converter 30. The input torque is equal to the back torque $T_{PROPTCM}$ applied on the crankshaft 66 by the torque converter 30. The back torque $T_{PROPTCM}$ may be determined using equations 12 or 13. The back torque $T_{PROPTCM}$ may be an average or mean torque and may be equal to a sum of the torques acting on the crankshaft 66 and downstream from the engine 16, such as a sum of the input hydrodynamic torque $T_{HYDINPUT}$, the torque converter clutch torque $T_{CT}$, and the transmission pump torque T. The back torque $T_{PROPTCM}$ may be used by an estimator of the TCM 54 and/or the ECM 50 for real-time (i.e., actual time at which an event occurs with negligible delay) determination of engine speed, engine acceleration and combustion torques.

$$T_{PROPTCM} = F\{T_{HYDINPUT}, T_{TC}, T_P\} \quad (12)$$

$$T_{PROPTCM} = T_{HYDINPUT} T_{CT} + T_P \quad (13)$$

At 218, the TCM 54 may receive, determine and/or monitor speed and acceleration of the engine 16. The engine speed and/or acceleration may be determined based on the input hydrodynamic torque $T_{HYDINPUT}$, the torque converter clutch torque $T_{CT}$ and the transmission pump torque $T_P$. The torques $T_{HYDINPUT}$, $T_{CT}$, $T_P$ may be commanded, estimated and/or measured torque valves and are less susceptible to measurement noise than differentiated engine speed signals. The TCM 54 may determine acceleration (and/or deceleration) of the engine 16 in real-time and generate a first acceleration signal. The first acceleration signal may be generated based on or as a function of the propulsion torque $T_{PROPTCM}$, the line pressure $P_{line}$, the mean engine speed $S_{Emean}$ (as determined by the ECM 50 and/or the TCM 54), turbine speed $S_T$, etc.

At 220, TCM 54 may adjust operation of the torque converter 30 and/or the transmission 32, such as by adjusting the slip torque $T_{slip}$, the engage pressure $P_{TCC}$, and/or the line pressure $P_{line}$. The slip torque $T_{slip}$ may be adjusted as described with respect to the tasks at 209. After 209 and/or 220 control may return to 202 or end at 238, as shown.

The above-described tasks 202-220 are meant to be illustrative examples; the tasks 202-220 may be performed sequentially, synchronously, simultaneously, continuously, during overlapping time periods or in a different order depending upon the application.

The real-time aspects of the above described embodiments allows for improved torque converter and transmission performance and improved fuel economy. Real-time information of engine speed information is fed forward to estimators (e.g., respective modules of a TCM) of engine speed, acceleration and combustion torque to account for dynamics in engine speed and the effect of weak cylinders. A target slip torque is determined based on the engine speed information to minimize torque converter clutch lock-up events. Dynamics of an engine are determined with reduced noise, as the dynamics are determined on engine side of a torque converter, as opposed to on transmission side. Efficient minimum slip clutch control is maintained while minimizing network bandwidth usage.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A control system comprising:
an engine control module; and
a transmission control module that wirelessly communicates with the engine control module,
wherein:
the engine control module generates a mean signal and a minimum signal, wherein the mean signal indicates a mean speed of an engine, and wherein the minimum signal indicates a minimum speed of the engine for a predetermined period;
the engine control module wirelessly transmits the mean signal and the minimum signal to the transmission control module;
the transmission control module controls operation of a torque converter and a transmission based on the mean signal and the minimum signal;
the torque converter is connected between the engine and the transmission; and
the transmission control module adjusts slip of the torque converter based on the mean signal and the minimum signal.

2. The control system of claim 1, wherein:
the engine control module receives at least one of an engine position signal and an engine speed signal from an engine speed sensor;
the engine control module determines the mean speed based on at least one of the engine position signal and the engine speed signal; and
the at least one of the engine position signal and the engine speed signal is indicative of an average engine speed for at least one combustion cycle of the engine.

3. The control system of claim 2, wherein:
the engine control module determines the minimum speed based on a minimum of at least one of the engine position signal and the engine speed signal; and
the minimum of the at least one of the engine position signal and the engine speed signal is determined over the predetermined period.

4. The control system of claim 3, wherein the predetermined period corresponds to length of the at least one combustion cycle of the engine.

5. The control system of claim 3, wherein the predetermined period corresponds to length of a plurality of combustion cycles of the engine.

6. The control system of claim 1, wherein:
the engine control module generates the mean signal and the minimum signal; and
the engine control module transmits the mean signal and the minimum signal to the transmission control module.

7. The control system of claim 1, wherein the minimum signal is an offset signal that is indicative of a maximum difference between the mean signal and a minimum engine speed of a raw engine speed signal.

8. The control system of claim 1, wherein the minimum signal is an offset signal that is indicative of a maximum difference between the mean signal and a minimum engine speed of a signal conditioned raw engine speed signal.

9. The control system of claim 1, wherein:
the engine control module generates the mean signal;
the engine control module transmits the mean signal to the transmission control module;
the transmission control module determines torque of the torque converter based on the mean signal; and
controls operation of the transmission based on the torque of the torque converter.

10. The control system of claim 1, wherein:
the mean signal indicates an average speed of the engine over one of (i) a combustion cycle of a cylinder of the engine, and (ii) a full combustion cycle of the engine, wherein the full combustion cycle of the engine includes one combustion cycle for each cylinder of the engine; and
the minimum signal indicates the minimum speed of the engine over one of (i) the combustion cycle of the cylinder of the engine, and (ii) the full combustion cycle of the engine.

11. The control system of claim 1, wherein:
the transmission control module
determines acceleration of the engine based on an input hydrodynamic torque, a torque converter clutch torque, and a transmission pump torque,
adjusts slip torque based on the acceleration of the engine, and
wirelessly transmits the acceleration of the engine to the engine control module; and
the engine control module adjusts throttle position, spark timing and fuel parameters based on the acceleration of the engine.

12. The control system of claim 1, wherein:
the transmission control module
determines acceleration of the engine based on a propulsion torque, a line pressure, the mean speed of the engine, and a turbine speed,
adjusts slip torque based on the acceleration of the engine, and
wirelessly transmits the acceleration of the engine to the engine control module; and
the engine control module adjusts throttle position, spark timing and fuel parameters based on the acceleration of the engine.

13. A control system comprising:
a transmission control module; and
an engine control module comprising:
a mean engine speed module that generates a mean signal based on a raw engine speed signal, wherein the mean signal indicates a mean speed of an engine,
a minimum engine speed module that generates a minimum signal based on the raw engine speed signal, wherein the minimum signal indicates a minimum speed of the engine for a predetermined period, and
a transceiver that wirelessly transmits the mean signal and the minimum signal to the transmission control module, wherein the minimum signal is an offset signal indicative of a maximum difference between the mean signal and a minimum engine speed of the raw engine speed signal, wherein the transmission control module controls operation of torque converter and a transmission based on the mean signal and the minimum signal, and wherein the transmission control module adjusts slip of the torque converter based on the mean signal and the minimum signal.

14. The control system of claim 13, wherein
the transceiver receives at least one of an engine position signal and an engine speed signal from an engine speed sensor;
the minimum engine speed module determines the mean speed of the engine based on at least one of the engine position signal and the raw engine speed signal; and
the at least one of the engine position signal and the raw engine speed signal is indicative of an average engine speed for a plurality of combustion cycles of the engine.

15. The control system of claim 14, wherein
the engine control module determines the minimum speed of the engine based on a minimum of at least one of the engine position signal and the raw engine speed signal;
the minimum of the at least one of the engine position signal and the raw engine speed signal is determined over the predetermined period; and
the predetermined period corresponds to length of the plurality of combustion cycles of the engine.

16. A transmission control module comprising:
a transceiver that wirelessly receives a mean signal and a minimum signal from an engine control module, wherein the mean signal indicates a mean speed of an engine, and wherein the minimum signal indicates a minimum speed of the engine for a predetermined period;
a torque slip module that adjusts a torque slip of a torque converter based on the mean signal and the minimum signal;
a torque converter module that determines a torque of the torque converter based on the mean speed; and
a propulsion torque module that determines a propulsion torque of the engine based on the torque of the torque converter.

17. The transmission control module of claim 16, wherein the torque slip module maintains a minimum torque slip on the torque converter based on the mean signal and the minimum signal.

18. The transmission control module of claim 17, wherein the minimum torque slip is set based on at least one of a predetermined number of torque converter lock-ups and a predetermined torque converter lock-up period.

* * * * *